United States Patent [19]

Walter

[11] 4,394,874
[45] Jul. 26, 1983

[54] VALVE CONSTRUCTION FOR QUICK-CLOSURE COUPLING

[75] Inventor: Friedrich C. Walter, Karlsruhe, Fed. Rep. of Germany

[73] Assignee: Argus Verwaltungsgesellschaft mbH, Ettlingen, Fed. Rep. of Germany

[21] Appl. No.: 252,943

[22] Filed: Apr. 10, 1981

[30] Foreign Application Priority Data

Apr. 23, 1980 [DE] Fed. Rep. of Germany ....... 3015485

[51] Int. Cl.³ ............................................. F16L 37/28
[52] U.S. Cl. ............................. 137/614.02; 251/149.6; 285/102
[58] Field of Search .................. 251/149.6, 150, 149.8; 285/83, 102, 106, 306; 137/614.01, 614.02, 614.03

[56] References Cited

U.S. PATENT DOCUMENTS

| | | | |
|---|---|---|---|
| 2,017,994 | 10/1935 | Spong | 285/306 |
| 2,921,801 | 1/1960 | Beyer | 285/306 |
| 3,215,161 | 11/1965 | Goodwin et al. | 285/102 |
| 3,500,859 | 3/1970 | Pearson | 251/149.8 |
| 3,791,411 | 2/1974 | Bogeskov et al. | 251/149.6 |
| 4,350,321 | 9/1982 | Berg | 251/149.6 |

FOREIGN PATENT DOCUMENTS 2853962  6/1979  Fed. Rep. of Germany ... 251/149.6

*Primary Examiner*—A. Michael Chambers
*Attorney, Agent, or Firm*—Max Fogiel

[57] ABSTRACT

A socket valve of a quick-coupling for fluid lines under pressure has a sliding sleeve into an end recess of which a portion of a plug valve of the coupling is insertable, to be held by locking means. The sleeve is movable between a securing position in which it holds the locking means in locking position, and two axially displaced release positions in which it permits the locking means to release the plug valve. The sleeve is spring-biased to the securing position. As an additional safety factor, the sleeve is surrounded by an annular chamber at least one open end of which receives an annular piston. The chamber is communicated with the pressure fluid in the valve so that, when the sleeve is in the securing position, the fluid pressure biases the piston to a position in which it prevents accidental uncoupling of the plug valve, even in the event the biasing spring for the sleeve should break.

12 Claims, 2 Drawing Figures

VALVE CONSTRUCTION FOR QUICK-CLOSURE COUPLING

BACKGROUND OF THE INVENTION

This invention relates to a socket valve, capable of being coupled to a plug valve, of a quick-closure coupling for lines carrying flowing media, especially hydraulic lines.

Quick closure couplings of this kind, which consist of a plug valve and a socket valve each having a closure member spring-biased to closing position, are already known. Such couplings are utilized, for example, in commercial vehicles where they serve for the optional coupling of attachment devices or the like, but they are also used in numerous other applications.

In one known coupling of this type the closure member of the socket valve, biased by a closure spring in the closure direction and held in the closed position when the coupling halves (i.e. the socket valve and the plug valve) are separated, is a conical member which is seated and guided in a sliding sleeve. The sleeve, in turn, is seated to be axially movable inside a stationarily mountable housing which establishes the pipe connection. From one end face there extends into this sliding sleeve a recess for the plug of the plug valve, and adjoining this recess there is disposed, in the interior of the sliding sleeve, a seating surface against which the corresponding seating surface of the closure member bears under the action of the closure spring, so long as the two halves of the coupling are separated. In this position of the closure member, the socket valve is closed. In the region of the end recess for the plug of the plug valve, blocking elements extend through the wall of the sliding sleeve which, when the halves of the coupling are joined together, penetrate into an annular recess of the plug portion and lock the two halves of the coupling in the coupled position against undesired separation. These blocking means are held in the described locking position by an annular blocking cam of the stationarily mountable housing which surrounds the sliding sleeve concentrically, and the sliding sleeve is displaceable relative thereto out of the blocking position which secures the blocking means in either axial direction against the action of a holding spring axially stressed between the sliding sleeve and the housing. On either side of the annular blocking cam, the housing is furnished with a radial recessed groove, into which the blocking means can escape radially after the sliding sleeve has been displaced with respect to the position in which the blocking means are locked. The two halves of the coupling can consequently be coupled or uncoupled when the annular blocking cam of the housing is displaced axially with respect to the position which prevents radial escape of the blocking means.

In this known coupling, the sliding sleeve is held in the securing position by means of the holding spring, seated in an annular space between the sliding sleeve and the housing and axially stressed between these latter, and in this securing position the blocking cam concentrically surrounds the blocking means and thereby prevents their radial escape. The arrangement is such that the annular space which seats the holding spring extends in equal parts radially into the housing and into the sliding sleeve, and the ends of the holding spring engage, in the region of the cylindrical contact surface, simultaneously against the annular shoulders, bounding the annular space of the sliding sleeve and of the housing, so that independently of the direction an axial displacement of the two components relative to each other always takes place only against the action of the prestressed holding spring. In the interest of secure holding of the sliding sleeve in the securing position, the holding spring must possess a predetermined stiffness (i.e. spring characteristic) and when a new plug valve is being coupled or uncoupled, correspondingly large axial forces have to be exerted. Moreover, it is possible, in the case of a breakage of the holding spring which cannot entirely be precluded, for accidental uncoupling to take place. Taking into account the plant unit being supplied with working medium through such a coupling, such accidential uncoupling can lead to dangerous situations.

SUMMARY OF THE INVENTION

It is a general object of the present invention to overcome the disadvantages of the prior art.

More particularly, it is an object of the invention to provide an improved socket valve of the type under discussion, which avoids those disadvantages.

A concommitant object is to provide such an improved socket valve in which accidental uncoupling is made impossible.

A coupling using the socket valve according to the invention is to be easier to couple and uncouple. Also, in the case of a breakage of the holding spring, the blocking means which lock the plug in the coupled position, are to be held in a position secured against radial escape so that accidental uncoupling cannot take place.

The purposes of the invention are achieved, in a socket valve capable of being coupled to a plug valve of a quick-coupling for fluid lines, by providing an annular chamber which can be loaded with medium pressure between the sliding sleeve and the housing and which chamber is bounded, at least at the end remote from the recess for the plug of a plug valve, by an axially movable annular piston which bears, in the securing position of the sliding sleeve, against an annular shoulder each of the sliding sleeve and of the housing. In the invention, consequently, the sliding sleeve is held in the securing position by at least one annular piston loaded with flowing fluid pressure, which piston bounds the annular chamber located between the sliding sleeve and the housing and is subjected to the pressure of the flowing medium at the end remote from the plug recess, so that independently of the holding spring a securing action is present against undesired uncoupling in all cases so long as a flowing pressure medium loading of the annular chamber is present. This is, basically, always the case when the socket valve is connected with a source of flowing pressure medium.

Within the ambit of the invention the annular chamber can, of course, also be bounded at both of its ends by respective axially movable annular pistons, the rear faces of which facing towards each other can be loaded by flowing pressure medium and which each bear, in the securing position of the sliding sleeve, against an annular shoulder of the sliding sleeve and of the housing.

It is of advantage if the annular chamber concentrically surrounds the flow path in the socket valve and is in flow communication with the latter through flow paths in form of radial bores, which pass through the wall of the sliding sleeve.

In the construction of the sleeve valve according to this invention, the holding spring which is axially stressed between the housing and the sliding sleeve is now of importance only when the sleeve valve is unpressurized. In this case, the holding spring holds the sliding sleeve in a central position corresponding to the securing position, out of which the sliding sleeve can be displaced for the purpose of coupling or uncoupling, in one or the other axial direction. In essence, this holding spring can be disposed completely independently of the annular chamber which can be subjected to the pressure of the flowing medium. It has, however, proved to be advantageous to dispose the holding spring, axially stressed between the housing and the sliding sleeve, under prestress between the annular piston which bounds the annular chamber at its one end and the chamber end face remote therefrom, and to construct it as a helical spring which covers, with its end remote from the annular piston, the dividing joint between the sliding sleeve and the housing and thus bears against end annular shoulders of the housing and of the sliding sleeve. If the annular chamber is equipped at both ends with annular pistons, it is advantageous to dispose the holding spring between these annular pistons and also to construct it as a helical spring which forces the annular pistons apart. Having regard to the above explained function, the holding spring can, of course, be of substantially weaker design than that known from the state of the art.

With regard to the annular pistons, these may be metal rings formed to correspond to the radial extent of the annular chamber, and which are furnished with O-ring seals cooperating with the cylindrical surfaces of the housing and of the sliding sleeve that bound the annular chamber. According to another embodiment of the invention the annular pistons may consist of grooved annular seals and of support rings disposed between the latter and the end faces of the annular chamber, whereby these support rings each bear, in the securing position of the sliding sleeve, against an annular shoulder axially bounding the annular chamber, of the sliding sleeve and of the housing.

The dimensioning of the loading surfaces of the annular pistons will, of course, be oriented according to the required holding forces for securing the sliding sleeve in the securing position, in which the blocking means in the region of the coupling recess for the plug are concentrically surrounded by the circumferential blocking cam of the housing. It has proved beneficial to equip the annular pistons with loading surfaces of equal or approximately equal sizes, whereby a slight difference in the sizes of these loading surfaces in the light of the frictional forces that arise during coupling and uncoupling, respectively, may be useful.

To enable the coupling to be disengaged even under high pressure, it is advantageous to adapt the inner and outer sealing diameters of the annular chamber and the loading area of the sliding sleeve to one another in such a manner that the forces that arise cancel each other out. This can be achieved in a simple way if, according to a further embodiment, the annular surface of the annular chamber and the loading surface of the sliding sleeve perpendicular to their direction of movement, are equal. Here, a structurally simple arrangement is obtained if the sealing diameter which surrounds the loading area of the sliding sleeve perpendicular to its direction of movement, is equal to the internal diameter of the annular chamber. If, in such a form of construction, the area encompassed by the external diameter of the annular chamber is twice as large as the area encompassed by the internal chamber diameter, then the loading areas of the sliding sleeve and of the annular chamber are equal to one another and consequently the forces that arise cancel out. In this case also, slight corrections to the diameter may prove to be advantageous in order to compensate the frictional influences which occur during coupling and uncoupling.

Two embodiments of the invention will be explained below with reference to the attached drawing, but are not to be considered limiting as to the inventive concept.

DESCRIPTION OF PREFERRED EMBODIMENTS

Figure 1:
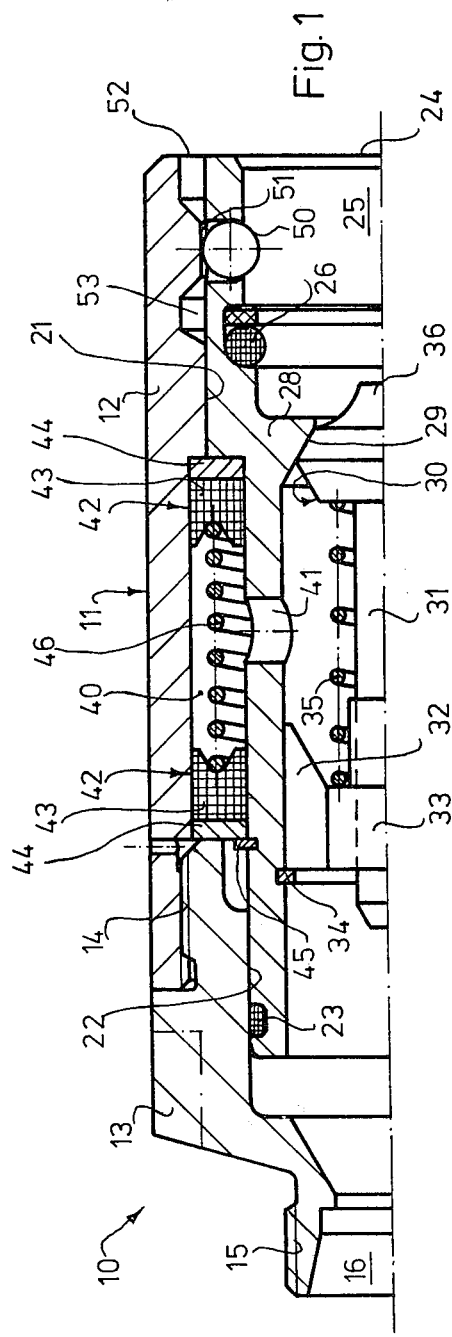
FIG. 1 illustrates a first embodiment in a somewhat diagrammatic half-sectional view.

The socket valve 10 illustrated in FIG. 1 has a housing 11 which consists of a jacket 12 open at both ends and of a sleeve 13. The sleeve 13 and the jacket 12 are threaded together at 14. At the end remote from the threaded joint, the housing sleeve is furnished with a threaded stub-pipe 15 for the connection of the coupling to a pipe; through this stub-pipe passes a central flow duct 16. The housing may be mounted in fixed position, in a manner of no further interest here, for example in the bulkhead of a vehicle.

Inside the housing 11 a sliding sleeve 20, formed as an internal component, is seated so as to be axially movable, with its one end located in a cylindrical guide 21 of the housing jacket 12 and with its other end in a cylindrical guide 22 of the housing sleeve 13. In the portion of the sliding sleeve 20 which points towards the threaded stub-pipe 15 having the flow duct 16, an annular seal 23 is seated in an annular groove; by means of this seal the sliding sleeve 20 is sealed relative to the cylindrical guide surface of the housing sleeve, against escape of the flowing medium. From the end face 24 that is remote from the housing sleeve 13, a substantially cylindrical recess 25 extends into the sliding sleeve 20; this recess 25 corresponds in its dimensions to the plug of a plug valve which is complementary to the socket valve and forms therewith the quick closure coupling. Recess 25 is equipped with a seal 26, of no further interest here, which in the coupled state of two halves (i.e. the two valves) of the coupling cooperates with the plug of the plug valve. The recess 25 is bounded in depth by an annular shoulder 28, which is formed at the side remote from the recess as a conical valve seating surface 29. A valve cone 30 equipped with a corresponding conical surface cooperates with the conical valve seating surface 29 the valve cone 30 is the closure valve member and is seated axially movable in the sliding sleeve. Proper guidance of the valve cone 30 is assured by a pilot stem 31 projecting from the cone towards the housing sleeve 13 in the valve axis, this stem being seated in a guide 33 which is supported and axially fixed against the inner walls of the sliding sleeve by radial webs 32. In axial respect this guide 33 is fixed by means of a snap ring 34 seated in an annular groove formed internally in the wall of the sliding sleeve. Between the guide 33 or the radial webs 32 supporting it and the rear face of the closure cone 30, a compression spring is disposed which concentrically surrounds the pilot stem 31 and biases the valve cone in the closure direction; when the coupling halves are uncoupled, the spring holds the valve cone in the closed position illustrated in the drawing.

In this closed position a projection 36 of the valve cone 30, which passes in the region of the annular shoulder 28 through the flow opening that is closed by the valve cone in the closed position, projects into the recess 25 for the plug of the plug valve, not shown. During the coupling of the valve plug, this projection cooperates in a manner of no interest here with a corresponding projection of the closure cone at the plug side.

In the region between the valve seating surface 29 which cooperates with the closure cone 30 and the threaded joint 14 which connects the jacket 12 of the housing 11 with the housing sleeve 13, there is disposed an annular chamber 40 which is in communication with the flow path through the valve via radial bores 41, serving as flow ducts, in the wall of the sliding sleeve 20. This annular chamber is closed at each of its two ends by an annular piston 42. These annular pistons each consist of a collor-like grooved annular seal 43 and of a support disc 44, disposed between the latter and the corresponding end face of the annular chamber. The support discs 44 of the annular pistons disposed at both ends of the annular chamber are situated, in the securing position of the sliding sleeve as illustrated in FIG. 1 which will be explained in more detail below, so as to bear against corresponding annular surfaces of the sliding sleeve and of the housing, which constitute end boundaries of the annular chamber 40. Whereas in the region of the jacket 12 of the housing 11 the annular chamber 40 penetrates radially both into the aforementioned housing jacket and into the sliding sleeve, so that the cylindrical guide surface 21 for the one end of the sliding sleeve is situated in the region of the radial extent of the annular chamber 40, at the end oriented towards the housing sleeve 13 the internal diameter of the annular chamber 40 is equal to the external diameter of the portion of the sliding sleeve 20 that is seated in the cylindrical guide surface 22, and which is sealed relative to its guide surface by means of the annular seal 23 against flowing fluid.

An annular shoulder, against which in the illustrated securing position, the support ring 44 of the corresponding annular piston 42 bears, is constituted by a snap ring 45, which is seated in an annular groove formed in the outer face of the sliding sleeve. Between the two annular pistons 42 or their grooved annular seals 43, a prestressed holding spring 46 is seated which biases the annular pistons 42 apart into the end positions illustrated in the drawing.

In the region of the end recess 25 for the plug of the plug valve, not illustrated here, locking balls 50 are seated in radial recesses of the wall of the sliding sleeve 20. In the coupled state these balls 50 penetrate into a corresponding annular groove in the plug of the plug valve and thus lock the plug when the same is seated in the coupling position in the recess. These locking balls 50 are held in the locking position by means of an annular blocking cam 51 in the region of the corresponding end of the jacket 12 of the housing 11. Adjoining the blocking cam 51 on either side in the axial direction are annular grooves 52, 53, into which the locking balls 50 can escape radially when the sliding sleeve 20 is so displaced in the one or the other axial direction that the locking balls are situated in the region of the aforementioned annular grooves.

Figure 2:
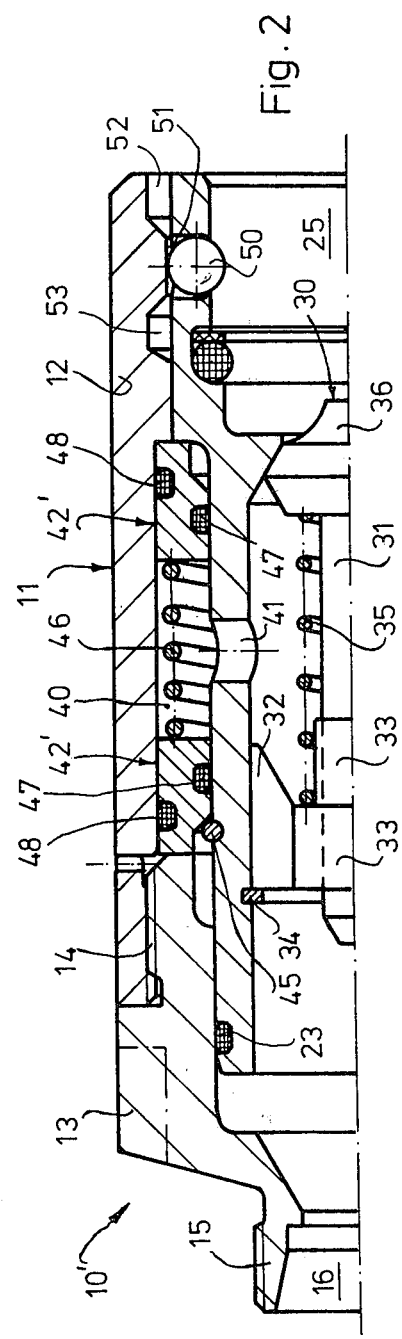
FIG. 2 illustrates a second embodiment in a view similar to FIG. 1, which differs from FIG. 1 solely in respect of the annular pistons which bound the annular chamber at its two ends.

In FIG. 2, the same reference numerals are used for the same components as in FIG. 1, but for corresponding components they bear an affixed prime symbol.

This embodiment of the socket valve 10' differs from the one according to FIG. 1 only by the construction of the annular pistons 42' which bound the annular chamber 40. These annular pistons 42' are likewise seated axially movable in the region of the two ends of the annular chamber and are sealed against flowing fluid by means of annular seals 47, 48 cooperating with the cylindrical face of the sliding sleeve 20 and with the cylindrical surface of the housing jacket 12 which constitutes the external chamber wall. These seals are seated in corresponding annular grooves in the annular pistons. These annular pistons 42' also bear directly against the annular shoulders of the housing and of the sliding sleeve, whereby once again at the end oriented towards the housing sleeve 13 a snap ring 45, set in an annular groove, serves as the annular shoulder of the sliding sleeve. Moreover, as in the embodiment according to FIG. 1, a holding spring 46 is prestressed between the annular pistons.

When the socket valve 10, 10' is depressurized, the sliding sleeve 20 is held in the securing position illustrated in FIGS. 1 and 2 as a consequence of the compression spring 46 acting between the housing and the sliding sleeve. Coupling with a plug valve is effected with the sleeve valve in unpressurized state. For the purpose of coupling, the plug of the plug valve is pushed into the end recess 25 of the sliding sleeve with an axial force which overcomes the compression force of the holding spring 46. The sliding sleeve 20 consequently experiences a displacement towards the left, until the locking balls 50 can escape into the annular groove 53 in the housing jacket 12. After this escape of the locking balls, a complete pushing-in of the plug into the recess 25 of the sliding sleeve 20 can take place and, under the action of the holding spring 46 stressed between this sleeve and the housing jacket 12 and of an inclined surface which bounds the annular blocking cam 51 towards the annular groove 53, the locking balls again move radially inwards and engage into an annular groove provided in the plug for locking purposes. The coupling operation is thereby completed and the plug is held in its coupled position, whereby during the coupling operation, the closure members of the socket valve and of the plug valve have moved into their opening positions in a manner that is of no interest here. If flowing medium is now supplied from a flowing medium source, the flow paths in the coupling are open to allow the medium to pan through. Having regard to the connection of the annular chamber 40 with the flow paths in the coupling through the radial bores 41 which pass through the walls of the sliding sleeve, it will be understood that the annular pistons 42, 42', respectively, disposed at the ends of the annular chamber are subjected to the pressure of the flowing medium. Having further regard to the simultaneous bearing of these annular pistons against annular shoulders of the housing and of the sliding sleeve, it can be appreciated that this sleeve is held in the securing position illustrated in the drawing under the action of this pressure exerted by the flowing medium.

The invention has hereinbefore described with reference to the drawing is susceptible of various modifications which are all intended to be encompassed within the scope and intent of the appended claims.

What is claimed is:

1. A socket valve, for use with a cooperating plug valve of a quick-closure coupling for fluid lines, comprising: a fixed housing; a sliding sleeve axially movable in said housing and having an end recess for insertion of a plug valve portion; a closure member on said sliding sleeve and biased to a closure position; an annular chamber defined between said sliding sleeve and said housing and having one end proximal to and another end remote from said recess; at least one axially movable annular piston bounding said chamber at least at said other end thereof; locking means in the region of said recess for locking the plug valve in the latter, said sleeve being movable axially out of a securing position in which said locking means lock said plug valve, into release positions in which the locking means release the plug valve; means for admitting pressure fluid into said chamber to urge said piston to bear in said securing position of said sleeve against shoulders of said sleeve and said housing, respectively, said shoulders being annular shoulders; and biasing means urging said sleeve to said securing position, ends of said chamber being closed off with said annular piston, said piston being subjected to said fluid and effect of said biasing means, said piston being positioned for preventing parts of said coupling from separating when subjected to the force of said pressure fluid, said chamber closed off with said piston subjecting said sliding sleeve and said housing to fluid pressure for maintaining said sliding sleeve in sealing position.

2. Socket valve according to claim 1, wherein said annular chamber concentrically surrounds the flow path in the valve, and said admitting means comprises radial bores penetrating the wall of said sliding sleeve; said biasing means comprising a holding spring axially stressed between the housing and the sliding sleeve and seated with prestress between the annular piston and an end face of the annular chamber remote therefrom, said spring having an end remote from the annular piston and which covers a dividing joint between the housing and the annular chamber and thus bears against end annular shoulders of the housing and of the sliding sleeve, said spring being seated between said annular piston and another annular piston bounding the one end of said annular chamber so as to force these pistons apart; said annular piston comprising a grooved annular seal and a support ring disposed between said seal and the proximal end face of the annular chamber, said annular pistons having loading surfaces of equal sizes; the annular surface of the annular chamber and the loading surface of the sliding sleeve perpendicular to its direction of movement being of equal dimensions, the sealing diameter encompassing the loading surface of the sliding sleeve perpendicular to its direction of movement being equal to the internal diameter of the annular chamber, the surface surrounded by the external diameter of the annular chamber being twice as large as the surface surrounded by the internal diameter of the annular chamber.

3. Socket valve according to claim 1, wherein said annular chamber concentrically surrounds the flow path in the valve, and said admitting means comprises radial bores penetrating the wall of said sliding sleeve.

4. Socket valve according to claim 1, wherein said biasing means comprise a holding spring axially stressed between the housing and the sliding sleeve and seated with prestress between the annular piston and an end face of the annular chamber remote therefrom, said spring having an end remote from the annular piston and which covers a dividing joint between the housing and the annular chamber and thus bears against end annular shoulders of the housing and of the sliding sleeve.

5. Socket valve as defined in claim 4, wherein said spring is a helical spring.

6. Socket valve according to claim 1, wherein said biasing means comprises a helical holding spring axially stressed between the housing and the sliding sleeve and seated between said annular piston and another annular piston bounding the one end of said annular chamber so as to force these pistons apart.

7. Socket valve according to claim 6, wherein said annular pistons have loading surfaces of equal sizes.

8. Socket valve according to claim 1, wherein said annular piston consists of a grooved annular seal and a support ring disposed between said seal and the proximal end face of the annular chamber.

9. Socket valve according to claim 1, wherein the annular surface of the annular chamber and the loading surface of the sliding sleeve perpendicular to its direction of movement are of equal dimensions.

10. Socket valve according to claim 9, wherein the sealing diameter encompassing the loading surface of the sliding sleeve perpendicular to its direction of movement is equal to the internal diameter of the annular chamber.

11. Socket valve according to claim 9, wherein the surface surrounded by the external diameter of the annular chamber is twice as large as the surface surrounded by the internal diameter of the annular chamber.

12. Socket valve according to claim 1, wherein the annular surface of the annular chamber and the loading surface of the sliding sleeve perpendicular to its direction of movement differ from one another in such a manner that the opposedly oriented axial forces resulting from the flowing medium pressure forces cancel each other out.

* * * * *